(12) United States Patent
Liu et al.

(10) Patent No.: US 7,455,450 B2
(45) Date of Patent: Nov. 25, 2008

(54) METHOD AND APPARATUS FOR TEMPERATURE SENSING IN INTEGRATED CIRCUITS

(75) Inventors: Huining Liu, Austin, TX (US); Larry D. Hewitt, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 71 days.

(21) Appl. No.: 11/246,855

(22) Filed: Oct. 7, 2005

(65) Prior Publication Data

US 2007/0081575 A1 Apr. 12, 2007

(51) Int. Cl.
*G01K 3/00* (2006.01)

(52) U.S. Cl. .................. 374/111; 702/130; 702/99; 331/57

(58) Field of Classification Search .............. 374/111; 331/57
See application file for complete search history.

(56) References Cited

U.S. PATENT DOCUMENTS

| | | | |
|---|---|---|---|
| 4,453,834 A * | 6/1984 | Suzuki et al. ............... 368/201 |
| 5,451,892 A | 9/1995 | Bailey | |
| 5,490,059 A | 2/1996 | Mahalingaiah et al. | |
| 5,502,838 A * | 3/1996 | Kikinis ...................... 713/501 |
| 5,563,928 A * | 10/1996 | Rostoker et al. .............. 377/20 |
| 5,694,308 A * | 12/1997 | Cave .......................... 363/59 |
| 6,067,508 A | 5/2000 | Conn, Jr. | |
| 6,091,255 A | 7/2000 | Godfrey | |
| 6,893,154 B2 * | 5/2005 | Gold et al. .................. 374/170 |
| 6,934,652 B2 * | 8/2005 | Gauthier et al. .............. 702/99 |
| 7,034,507 B2 * | 4/2006 | Lovett ........................ 320/150 |
| 7,036,030 B1 | 4/2006 | Altmejd | |
| 7,144,152 B2 * | 12/2006 | Rusu et al. .................. 374/141 |
| 7,148,763 B2 * | 12/2006 | Sutardja ..................... 331/176 |
| 7,197,419 B2 * | 3/2007 | Floyd et al. ................. 702/130 |
| 2002/0150141 A1 * | 10/2002 | Kishi ......................... 374/141 |
| 2003/0158683 A1 * | 8/2003 | Gauthier et al. ............... 702/99 |
| 2004/0037346 A1 * | 2/2004 | Rusu et al. .................. 374/121 |
| 2004/0135643 A1 | 7/2004 | Clabes et al. | |
| 2006/0194561 A1 * | 8/2006 | Norman et al. ............. 455/333 |

OTHER PUBLICATIONS

Notification of Transmittal of the International Search Report and the written opinion of the International Searching Authority, PCT/US206/032920, Jan. 16, 2007.

Written Opinion of the International Searching Authority, PCT/US206/032920, Jan. 16, 2007.

* cited by examiner

*Primary Examiner*—Gail Verbitsky
*Assistant Examiner*—Megann E Vaughn
(74) *Attorney, Agent, or Firm*—Meyertons Hood Kivlin Kowert & Goetzel, P.C.; Erik A. Heter

(57) ABSTRACT

A method and apparatus for temperature sensing in an IC. The IC includes a plurality of remote temperature sensors each coupled to a control logic unit. The plurality of remote temperature sensors may be distributed throughout the integrated circuit. The integrated circuit includes a reference unit coupled to provide a reference temperature to the control logic unit and a reference sensor coupled to provide a signal having a reference frequency to the control logic unit. The reference unit and the reference sensor are located near each other. The control logic unit is configured to correlate the reference frequency received from the reference sensor with the reference temperature received from the reference unit. The control logic unit is further configured to determine the temperature of each of the remote temperature sensors based on this correlation, and also configured to determine the maximum temperature of all of the temperature sensors.

17 Claims, 4 Drawing Sheets

METHOD AND APPARATUS FOR TEMPERATURE SENSING IN INTEGRATED CIRCUITS

BACKGROUND OF THE INVENTION

1. Field of the Invention

This invention relates to electronic systems, and more particularly, to the detection of temperatures in an integrated circuit.

2. Description of the Related Art

One of the problems that must be dealt with in the design of electronic systems is the generation of heat. Integrated circuits (IC's) are a source of a significant portion of the heat generated by electronic circuits. Thus, many IC's include one or more temperature sensors to allow the monitoring of the temperature of the IC die during operation. Various mechanisms may be used with temperature sensors to reduce or cut off power to an IC when its temperature reaches a critical point that above which damage might occur.

Some IC's may require multiple temperature sensors. This is due to the fact that many of these IC's do not generate heat evenly. Some portions of the silicon die may include a higher circuit density than other areas, and thus may generate more heat than other less dense areas. The type of circuitry on various portions of a silicon die may also affect heat generation. For example, a portion of an IC including static memory that is not frequently accessed may generate less heat than arithmetic circuitry that is frequently used. Thus, temperature sensors may be placed at various points on the die according to the amount of heat generated by circuitry in the general vicinity.

Determining the placement of temperature sensors may not always be a straightforward issue. Circuit density in some areas where temperature sensors are necessary may limit placement options. For example, the number and placement of temperature sensors in a processor core may be constrained by the core's circuit density. Another consideration that may limit the placement of temperature sensors is the routing of signals, particularly in dense areas such as a processor core. The amount of area consumed by each temperature sensor circuit may further constrain both the number of temperature sensors employed as well as their placement within a circuit. Thus, limits on the number of temperature sensing circuits and the placement of each may in turn reduce the effectiveness of the overall temperature sensing system. Power supply considerations may be another limiting factor, as power supply voltages most suitable for certain types of sensors (e.g., analog power supplies for analog temperature sensors) may be unavailable in a given processor core.

SUMMARY OF THE INVENTION

A method and apparatus for temperature sensing in an integrated circuit is disclosed. In one embodiment, an integrated circuit includes a plurality of remote temperature sensors each operatively coupled to a control logic unit. The plurality of remote temperature sensors may be distributed to various locations throughout the integrated circuit. The integrated circuit also includes a reference unit coupled to provide a reference temperature to the control logic unit and a reference sensor coupled to provide a signal having a reference frequency to the control logic unit. The reference unit and the reference sensor are located near each other. The control logic unit is configured to correlate the reference frequency received from the reference sensor with the reference temperature received by the reference unit. The control logic unit is further configured to determine the temperature of each of the remote temperature sensors based on this correlation, and also configured to determine the maximum temperature of all of the temperature sensors.

In one embodiment, the reference sensor and each of the remote temperature sensors includes a ring oscillator. Each ring oscillator produces an output signal that is provided to the control logic unit. Since the reference unit (which provides the reference temperature to the control logic unit) is located close to the reference sensor, the temperature provided by the reference unit is substantially the same as that of the reference sensor. The control logic unit correlates the frequency of the signal provided by the reference sensor and the temperature provided by the reference unit to determine a relationship between temperature and frequency. Based on this relationship, the control logic unit may determine the temperature for each of the remote temperature sensors based on the frequency of their respective output signals.

The use of remote temperature sensor circuits based on ring oscillators may allow for area savings and/or allow the use of a greater number of temperature sensors, and may also allow for easier routing of the signal paths since the outputs digital signals. These digital signals may be driven by a core repeater, and do not require shielding.

BRIEF DESCRIPTION OF THE DRAWINGS

Other aspects of the invention will become apparent upon reading the following detailed description and upon reference to the accompanying drawings in which.

Figure 1:
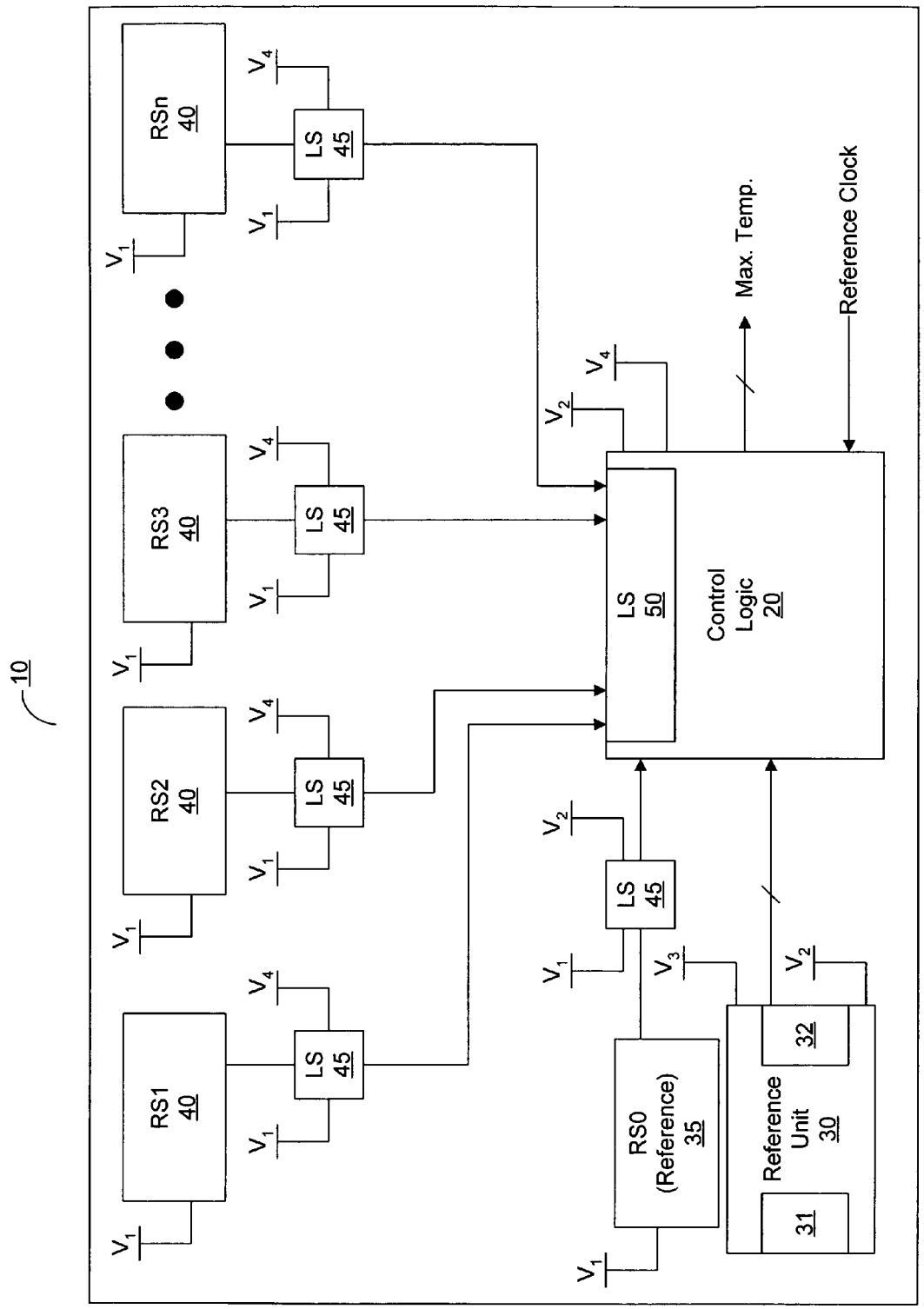
FIG. 1 is a block diagram of one embodiment of an integrated circuit having a temperature monitoring system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a block diagram of one embodiment of an integrated circuit having a temperature monitoring system is shown. In the embodiment shown, the circuitry of integrated circuit (IC) 10 includes a control logic unit 20. IC 10 includes a plurality of remote temperature sensors 40, each of which is operatively coupled to control logic unit 20. In this particular embodiment, each of the remote temperature sensors 40 is in a different voltage domain than control logic unit 20. Thus, each remote temperature sensor 40 is coupled to control logic unit 20 via a level shifter. Embodiments wherein the remote temperature sensors 40 are in the same voltage domain as control logic unit 20 (and thus obviating the need for level shifters 45) are possible and contemplated.

In addition to the plurality of remote temperature sensors 40, a reference sensor 35 and a reference unit 30 are also coupled to control logic unit 20. Reference unit 30 includes a temperature sensor 31, and is coupled to provide a reference temperature to control logic unit 20. The temperature sensor in reference unit 30 may be one of several common types of temperatures sensors, and may include one or more thermocouples, a gain circuit (i.e. an amplifier). In the embodiment shown, reference unit also includes an analog-to-digital (A/D) converter 32 configured to convert an indication of the temperature received from temperature sensor 31 to a digital format. After conversion to a digital format, the temperatures may be conveyed to control logic unit 20 as a number of bits in parallel (although embodiments where the temperature indication is conveyed in a digital serial format are possible and contemplated, as are embodiments where the temperature indication is conveyed in an analog format).

Reference sensor 35 is located near reference unit 30. Reference sensor 35 includes a ring oscillator, and it coupled to provide an output signal to control logic unit 20. It should be noted that, in the embodiment shown, reference sensor is identical to each of the remote sensors and operates in the same voltage domain. Due to their location in the proximity of each other, it is assumed that (during operations of IC 10) the temperatures of reference sensor 35 and reference unit 30 are substantially equal. Control logic unit 20 is configured to determine a relationship between temperature and frequency by correlating the frequency (i.e. the 'reference frequency') of the output signal received from reference sensor 35 to the reference temperature received from reference unit 30. The frequency of the output signal received from a ring oscillator varies with the temperature, as will be explained in further detail below. During operations of IC 10, control logic unit 20 may perform more than one correlation in order to more accurately determine the relationship between temperature and frequency.

Control logic unit 20 is coupled to receive an output signal from each of the remote temperature sensors 40. Each of the remote temperature sensors 40 may include a ring oscillator that is identical to the ring oscillator used to implement reference sensor 35. The frequency of an output signal produced by a ring oscillator varies with temperature. Control logic unit 20 is configured to determine a frequency of the output signal received from each of the remote temperature sensors 40, and based on the determined temperature frequency relationship, determine their respective temperatures. After determining the temperature for each of the remote temperature sensors 40, control logic unit 20 determines the maximum temperature for all of the temperature sensors (including the temperature provided by the reference unit). This temperature may be output to another unit within or external to IC 10, which may take action based on the maximum temperature value provided by control logic unit 20 (e.g., increasing the speed of a system fan).

In the embodiment of FIG. 1, determining the frequency for the output signals provided by each of the remote temperature sensors, as well as that of the reference sensor, is based on a reference clock signal received by control logic unit 20. The frequency of the output signal provided by a remote temperature sensor (or the reference sensor) may be determined by counting the number of cycles of the reference clock signal that occur for a predetermined number of the output signal. Based on the number of clock cycles counted during the predetermined number of output signal cycles, the frequency of the output signal can be determined, as the frequency of the reference clock signal is a known quantity.

In the embodiment shown, control logic unit 20 is in a different voltage domain than reference sensor 35 and each of remote temperature sensors 40. Thus, level shifters 45 are coupled between each sensor and control logic unit 20 in order to convert the voltage of their respective output signals to the voltage domain of control logic unit 20. In other embodiments, the temperature sensors (including the reference sensor) may be in the same voltage domain as the control logic unit, thus eliminating the need for level shifters. In this particular embodiment, each of the remote temperature sensors 40 and reference sensor 35 receive power from voltage supply $V_1$, while control logic 20 receives voltage from voltage supply $V_2$. Each of the level shifters 45 receives voltage from voltage supply $V_1$ and another voltage supply $V_4$ so as to enable the necessary level shifting. The voltage supplied by $V_4$ in one embodiment may be a core voltage for IC 10. Control logic 20 includes a level shifter for level shifting from voltage $V_4$ to voltage $V_2$. In one embodiment, IC 10 may be a processor configured to receive multiple voltages. However, variations of the temperature monitoring system shown here may be implemented within other types of IC's as well.

Reference unit 30 in this particular embodiment is coupled to receive voltage from voltage supply $V_2$ as well as from a third voltage supply, $V_3$. Voltage supply $V_3$ may supply voltage to analog circuitry, such as analog temperature sensor 31 located within this embodiment of reference unit 30. Voltage supply $V_2$ may supply voltage to digital circuitry within reference unit 30, such as analog-to-digital converter 32, which is configured to convert an analog output of temperature sensor 31 to a digital format suitable for being received by control logic 20.

It should be noted that the configuration of the temperature monitoring system in IC 10 is but one possible configuration, as other configurations are also possible and contemplated. Other such configurations may include different voltage supplies in both the type and number present, different level shifters, and the presence of repeaters in order to drive signals to their respective destinations.

Figure 2:
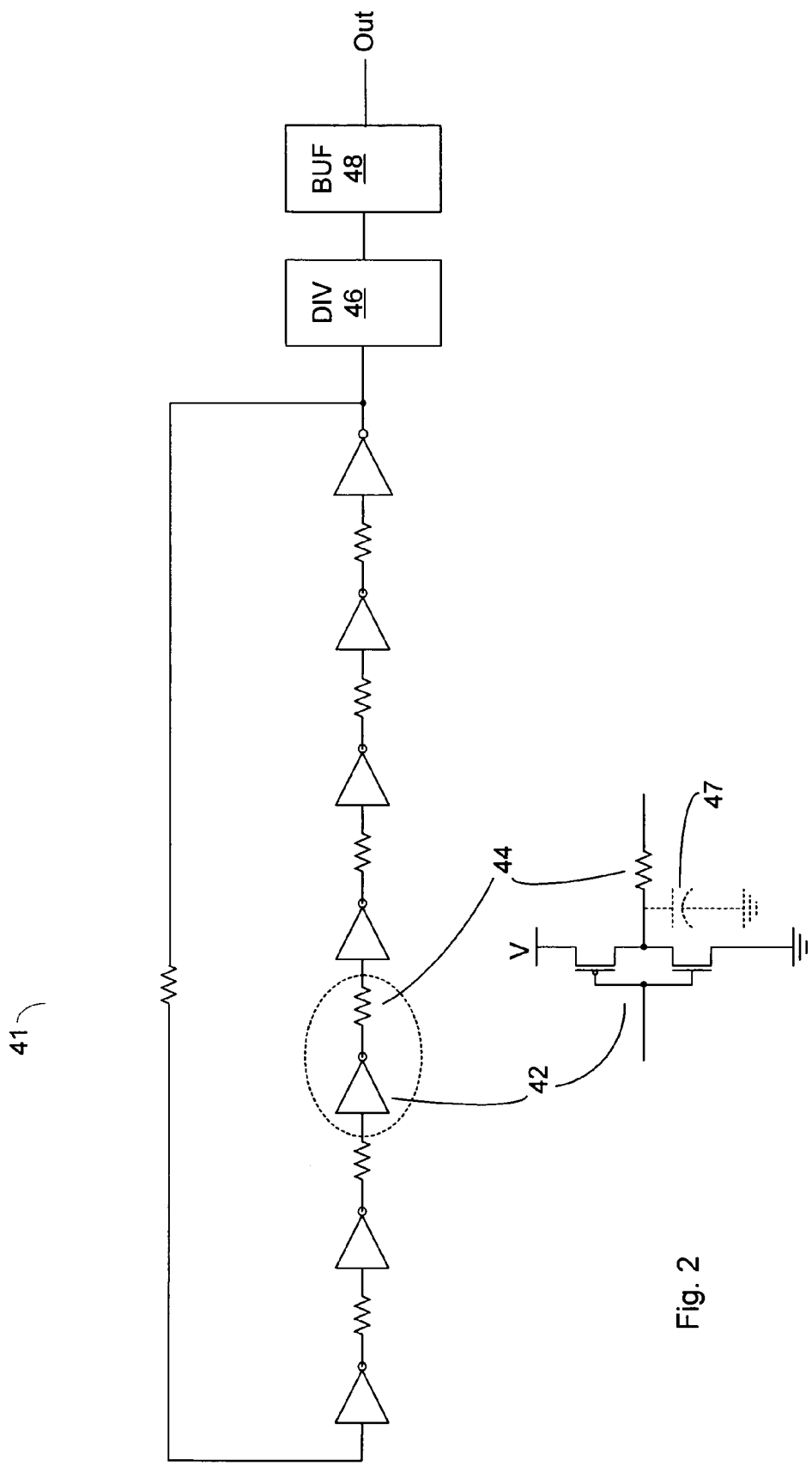
FIG. 2 is a schematic diagram of one embodiment of a ring oscillator used as a remote temperature sensor.

Moving now to FIG. 2, a schematic diagram of one embodiment of a ring oscillator is shown. Ring oscillator 41 is one embodiment of a ring oscillator that may be used to implement both reference sensor 35 and remote temperature sensor 40. Other embodiments of a ring oscillator may also be used to implement reference sensor 35 and a remote temperature sensor 40. Ring oscillator 41 also includes a divider 46 coupled to the output and a buffer 48 coupled to the divider output. Divider 46 and buffer 48 may condition the output signal provided by ring oscillator 41.

In the embodiment shown, ring oscillator 41 includes an odd number of inverters 42. In other embodiments, the exact number of inverters may be a greater or lesser number. In general, there is no theoretical limit to the number of inverters used to implement a ring oscillator, and the exact number is limited only by practical limitations for the particular circuit as well and the requirement that the number of inverters be odd, if using single-ended inverters.

For this particular embodiment, each inverter is implemented using a simple configuration having a p-channel and an n-channel transistor as shown in the drawing. Embodiments using other circuit configurations are also possible. A resistor 44 is coupled between the output of each inverter and the input of a next inverter. The use of resistors 44 as shown in FIG. 2 may allow for better control of impedance and lead to more stable operation of ring oscillator 41. In particular, the use of the resistor may allow for better control of the temperature sensitivity of ring oscillator 41. The resistor may constructed of a stack of metal in the silicon and may provide a linear relationship between resistance and temperature, thereby increasing the temperature sensitivity.

In the embodiment shown, an optional capacitor 47 is shown coupled at the node between the output of inverter 42 and resistor 44 and a ground node. Other capacitors may be present, and may have a terminal coupled to either the ground node or the voltage node. In one embodiment, capacitor 47 may simply represent parasitic capacitance within the circuit. However, capacitor 47 (as well as any other capacitors that may be present in the circuit) may be designed into the circuit in order to provide extra capacitance. Extra capacitors may be implemented into the circuit using design techniques that are well known to those skilled in the art.

The extra capacitance provided by capacitors included in the circuit by design may have the effect of slowing the range of frequencies at which ring oscillator 41 oscillates. In some embodiments, the range of frequencies may be such that the ring oscillator operates in a range of frequencies that is substantially slower than the surrounding circuitry. This in turn may provide a measure of noise immunity (e.g., from switching noise in the processor core) for both the ring oscillator circuit itself as well as a signal path from the ring oscillator output to a control logic unit (e.g., control logic unit 20, which is located outside of the processor core in the embodiment of FIG. 1). Thus, if remote temperature sensors implemented using an embodiment of ring oscillator 41 are placed in a processor core, ring oscillator 41 may be designed to oscillate and produce an output signal that is within a range of frequencies at least an order of magnitude slower than the clock speed of the reference clock of the PLL on the processor die. For example, if the reference clock operates at a clock speed of 200 MHz, ring oscillator 41 may be designed to operate within a range of frequencies having a maximum frequency that is approximately 20 MHz, and thus provide an output signal that is less than 20 MHz.

In addition to the presence of capacitors to slow the operating speed of ring oscillator 41, divider 46 may further reduce the frequency of the output signal. Buffer 48 may provide additional signal strength for driving the output signal to the nearest buffer in the core, which may then relay the signal to control logic 20. In some embodiments, rather than operating the ring oscillator in a range of frequencies that is an order of magnitude less than the clock frequency of PLL reference clock, the divider 46 may be used to reduce the frequency of the output signal of the ring oscillator so that is it at least an order of magnitude less than the core clock frequency.

As previously noted, the frequency of the output signal from a ring oscillator such as ring oscillator 41 can vary with temperature. More particularly, the temperature and frequency may approximate an inversely proportional relationship to each other. Thus, for a temperature sensor based on a ring oscillator, an increase in temperature may result in the output signal having a lower frequency. Similarly, a decrease in the temperature for a given temperature sensor may result in an increase in the frequency of its output signal. The following equation describes the relationship between temperature and frequency for one embodiment:

$$T_{RS}=T_{REF}+[(P_{RS}-P_{REF})/P_{REF}]*[RS_{CONST}+T_{REF}]+F_{RS},$$

where:

$T_{RS}$=the remote sensor temperature;

$T_{REF}$=the temperature provided by the reference unit;

$P_{RS}$=the number of clock cycles counted during a predetermined number of cycles from the output signal from the remote temperature sensor;

$P_{REF}$=the number of clock cycles counted during a predetermined number of cycles from the output signal of the reference sensor;

$RS_{CONST}$=a constant indicating the ratio of the output signal period at a first temperature to the period at a second temperature; and $F_{RS}$=an offset temperature value, if necessary.

In the above equation, an increasing value of $P_{RS}$ indicates that the frequency of the output signal is decreasing, as a longer period of time is required to complete the predetermined number of cycles of the output signal. Conversely, a decreasing value indicates that the output signal frequency is increasing as the amount of time to complete the predetermined number of output signal cycles decreases. Based on this, an examination of the equation above shows that frequency and temperature maintain an inverse relationship to each other—increasing frequency indicates a decreasing temperature, while a decreasing frequency indicates an increasing temperature.

It should be noted that the above equation does not necessarily apply to all possible embodiments for a temperature sensor that fall within the scope of this disclosure. The form of the equation used to describe the relationship between temperature and frequency (or temperature and the period of a signal) may vary depending on the specific implementation.

Figure 3:
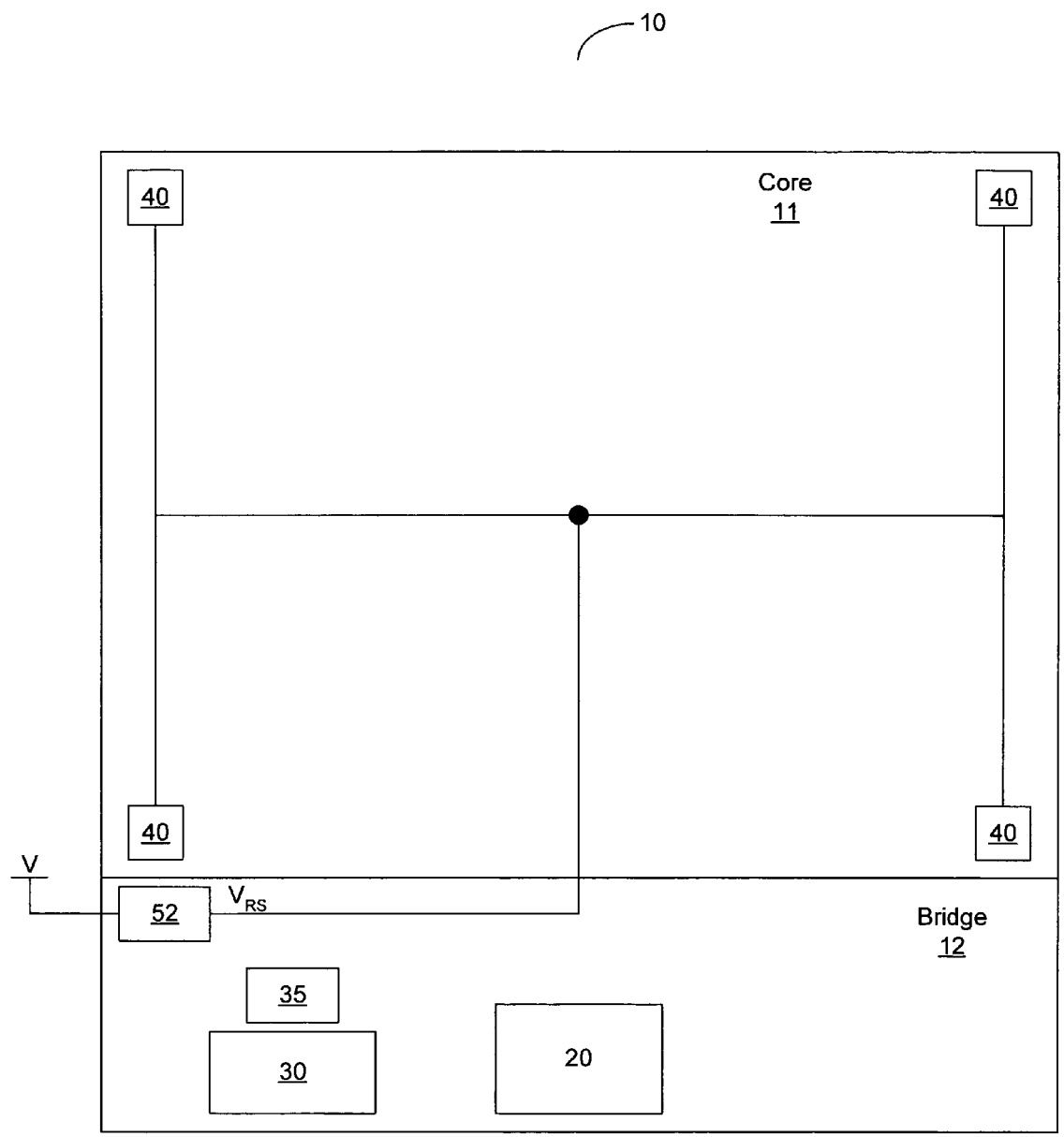
FIG. 3 is a drawing illustrating power distribution to a plurality of remote sensors for one embodiment of an integrated circuit.

FIG. 3 is a drawing illustrating power distribution to a plurality of remote sensors for one embodiment of an integrated circuit. More particularly, FIG. 3 illustrates one method of power distribution to a plurality of remote temperature sensors. In this particular embodiment, IC 10 is a processor having a processor core 11 and a bridge unit 12. A plurality of remote temperature sensors 40 is located in processor core (a greater or lesser number of remote temperature sensors may be included in other embodiments). A voltage regulator 52 is located within bridge unit 12, and is coupled to receive a voltage from voltage supply V. In one embodiment, voltage supply V may be the same voltage supply that supplies voltage to the processor core 11. In another embodiment, voltage supply V may be different from the core voltage supply, although the voltage level supplied may be approximately the same. In still another embodiment, the voltage supplied by voltage supply V may be different from the core voltage supply.

Voltage regulator 52 is configured to provide an output voltage $V_{RS}$. Voltage $V_{RS}$ is conveyed to a designated point in processor core 11. From this point, voltage $V_{RS}$ is distributed to each of the plurality of remote temperature sensors 40. The distance from the designated point along the conductive path to each of the remote sensors 40 is approximately equal. Additional remote temperature sensors 40 may be present, and although the geometry of the routing may be different from the from what is shown in this particular drawing, the resistance of the conductive paths through which the voltage is supplied to each of the remote temperature sensors may be substantially equal. Consequently, any voltage drop (for example, 0.1 volts from a 1.2 volt supply at the output of voltage regulator 52) caused by resistance in the conductive paths is substantially equal. Since this voltage drop send by each of the plurality of remote temperature sensors is substantially equal, each will receive approximately the same supply voltage. Distributing a supply voltage to each of the plurality of remote temperature sensors may allow them to receive power at a voltage that is substantially equal to the core voltage while not being subject to any variations encountered by circuitry powered by the core voltage supply.

It should be noted that the embodiment of IC 10 shown in FIG. 3 may be compatible with the block diagram shown in FIG. 1, and thus includes a reference sensor 35, a reference unit 30, and a control logic unit 20 (each of which is located in within the bridge unit 12 in this embodiment). While the connections between these units are not explicitly shown here (for the sake of simplicity), their connections are understood to be the same as for the embodiment illustrated by the block diagram of FIG. 1.

Figure 4:
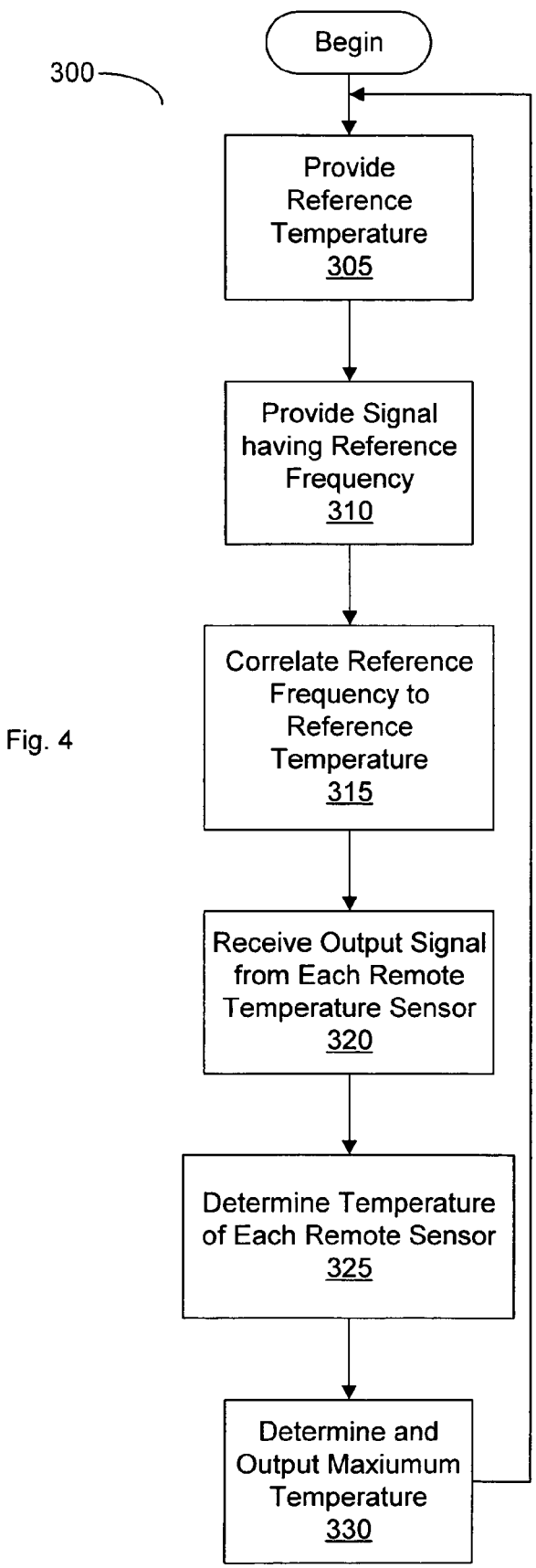
FIG. 4 is a flow diagram of one embodiment for determining a maximum temperature present in an integrated circuit.

Moving now to FIG. 4, a flow diagram of one embodiment for determining a maximum temperature present in an integrated circuit is shown. In the embodiment shown, method 300 begins with the providing of a reference temperature (305) and a reference frequency (310). Once the reference temperature and reference frequency have been provided, a temperature-frequency relationship is determined by correlating the reference frequency to the reference temperature (315). It should be noted that in some embodiments, multiple reference temperatures and reference frequencies may be provided in order to allow a greater number of data points for correlation. This may allow for more accuracy in determining the temperature-frequency relationship. It is also noted that, while the frequency may be expressed indirectly, such as a count of the number of cycles of an output signal occurring during a predetermined number of reference clock cycles, as discussed above.

With the temperature-frequency relationship determined, the temperature of remote temperature sensors may be determined. More particularly, each remote temperature sensor (based on a ring oscillator as previously described) may provide an output signal (320). The frequency of this output signal may be determined in the same manner as the reference frequency was determined. Using the frequency of the output signal provided by a given remote temperature sensor and the previously determined temperature-frequency relationship, the temperature for each of the remote temperature sensors is determined (325). After determining the temperature for each of the remote temperature sensors, all of the determined temperatures (including the reference temperature) may be compared to determine the maximum temperature, which is provided as an output (330). The maximum temperature provided as an output may be used by other units within the electronic system for various purposes, such as increasing the speed of a cooling fan, lowering the amount of work performed by the IC for which the maximum temperature was determined, or even shutting down the IC if the maximum temperature meets or exceeds a critical limit.

After outputting the maximum temperature, the method may return to its beginning and repeat.

Other embodiments of the method described herein are possible and contemplated. For example, upon power up of an IC for which the method is implemented, multiple reference temperature and reference frequency readings may be performed, allowing the temperature-frequency relationship to be more accurately described over a range of temperatures and frequencies. The method may also include periodically re-calculating the temperature-frequency relationship, and may also include outputting the maximum temperature at predetermined intervals.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. An integrated circuit comprising:
   a plurality of remote temperature sensors;
   a reference sensor wherein the reference sensor and each of the plurality of remote temperature sensors include a ring oscillator;
   a reference unit configured to provide a reference temperature, wherein the reference sensor is located near the reference unit; and
   a control logic unit operatively coupled to each of the plurality of remote temperature sensors and the reference unit, wherein the control logic is configured to determine a temperature of each the plurality of temperature sensors based on the reference temperature and a signal provided by the reference sensor and further configured to determine a maximum temperature of the plurality of remote temperature sensors and the reference sensor;
   wherein the integrated circuit is a processor having a processor core and a bridge unit, wherein each of the plurality of remote temperature sensors are located in the processor core, and wherein the reference sensor, reference unit, and the control logic unit are located in the bridge unit; and
   wherein the ring oscillator of the reference sensor and each of the plurality of remote temperature sensors are configured to provide an output signal within a range of frequencies, wherein a maximum frequency in the range of frequencies is at least one order of magnitude less than a clock frequency at which the processor core operates.

2. The integrated circuit as recited in claim 1, wherein the control logic unit is coupled to receive the reference temperature from the reference unit and the signal provided by the reference sensor, the signal provided by the reference sensor having a reference frequency, and wherein the control logic is configured to correlate the reference temperature to the reference frequency.

3. The integrated circuit as recited in claim 2, wherein the control logic unit is configured to receive an output signal from each of the plurality of remote temperature sensors, wherein the control logic unit is configured to determine a frequency for each output signal and further configured to determine a temperature for each remote temperature sensor based on the frequency of its respective output signal.

4. The integrated circuit as recited in claim 3, wherein the control logic unit is coupled to receive a reference clock signal, and wherein the control logic unit is configured to determine the reference frequency by determining a number of cycles of the reference signal occurring within a predetermined number of cycles of the reference clock signal and further configured to determine the frequency for each output signal by determining a number of cycles of each output signal occurring during the predetermined number of cycles of the reference clock signal.

5. The integrated circuit as recited in claim 4, wherein the control logic unit is further configured to determine the temperature of each of the plurality of remote temperature sensor based on a temperature equation.

6. The integrated circuit as recited in claim 3, wherein each ring oscillator includes an odd number of inverters and a resistor coupled to the output of each of the odd number of inverters.

7. The integrated circuit as recited in claim 1, wherein the control logic unit is in a first voltage domain and wherein the reference sensor and each of the plurality of remote sensors are in a second voltage domain.

8. The integrated circuit as recited in claim 7, wherein the integrated circuit further includes a level shifter coupled between each of the plurality of remote temperature sensors and the control logic unit.

9. The integrated circuit as recited in claim 7 wherein the integrated circuit includes a level shifter coupled between the reference sensor and the control logic unit.

10. A method comprising for monitoring a temperature of a processor, the method comprising:
providing a reference temperature and a signal having a reference frequency to a control logic unit;
providing an output signal from each of a plurality of remote temperature sensors to the control logic unit;
determining a correlation between temperature and frequency based on the reference temperature and the reference frequency;
determining a temperature for each of the plurality of remote temperature sensors based on a frequency of the output signal for each of the plurality of remote temperature sensors and the correlation between temperature and frequency; and
determining a maximum temperature for the plurality of remote temperature sensors and the reference sensor;
wherein the reference frequency and the frequency of the output signal for each of the plurality of remote temperature sensors is within a range of frequencies, and wherein a maximum frequency in the range of frequencies is at least one order of magnitude less than a clock frequency at which a core of the processor operates.

11. The method as recited in claim 10, wherein the reference sensor and each of the plurality of remote temperature sensors includes a ring oscillator, and wherein the control logic unit is configured to determine a frequency for the output signal produced by each of the plurality of remote temperature sensors, and wherein the control logic unit is further configured to determine the temperature for each of the plurality of remote sensors based on a frequency of its respective output signal.

12. The method as recited in claim 11, further comprising the control logic unit receiving a reference clock signal, wherein the control logic unit is configured to determine the reference frequency by determining a number of cycles of the reference signal occurring within a predetermined number of cycles of the reference clock signal and further configured to determine the frequency for each output signal by determining a number of cycles of each output signal occurring during the predetermined number of cycles of the reference clock signal.

13. The method as recited in claim 12, wherein the control logic unit is further configured to determine the temperature of each of the plurality of remote temperature sensors based on a temperature equation.

14. The method as recited in claim 11, wherein each ring oscillator includes an odd number of inverters and a resistor coupled to the output of each of the odd number of inverters.

15. The method as recited in claim 10, wherein the control logic unit is in a first voltage domain and wherein the reference sensor and each of the plurality of remote temperature sensors are in a second voltage domain.

16. The method as recited in claim 15, further comprising level shifters shifting the output signal from each of the plurality of remote temperature sensors from the second voltage domain to the first voltage domain.

17. The method as recited in claim 15, further comprising a level shifter shifting the signal having the reference frequency from the second voltage domain to the first voltage domain.

* * * * *